(12) United States Patent
Wilson

(10) Patent No.: US 7,344,433 B2
(45) Date of Patent: Mar. 18, 2008

(54) SYSTEM FOR MATCHED-STONE COVER PLATES

(76) Inventor: Ronald J. Wilson, 3156 W. Clarendon, Phoenix, AZ (US) 85017

( * ) Notice: Subject to any disclaimer, the term of this patent is extended or adjusted under 35 U.S.C. 154(b) by 1328 days.

(21) Appl. No.: 10/196,628

(22) Filed: Jul. 15, 2002

(65) Prior Publication Data
US 2003/0106703 A1    Jun. 12, 2003

Related U.S. Application Data

(60) Provisional application No. 60/305,210, filed on Jul. 13, 2001.

(51) Int. Cl.
*B24B 1/00* (2006.01)
*H02G 3/14* (2006.01)

(52) U.S. Cl. ............... 451/41; 174/66; 174/67; 125/1

(58) Field of Classification Search ........... 451/41, 451/285, 286–290; 125/1; 174/66
See application file for complete search history.

(56) References Cited

U.S. PATENT DOCUMENTS

| 4,579,768 A * | 4/1986 | Post ................... 428/187 |
| 6,870,099 B1 * | 3/2005 | Schultz et al. ........... 174/53 |
| D505,856 S * | 6/2005 | Kim et al. ............. D8/353 |
| D507,476 S * | 7/2005 | Zahedi et al. ........... D8/353 |

\* cited by examiner

*Primary Examiner*—Lee D. Wilson
*Assistant Examiner*—Anthony Ojini
(74) *Attorney, Agent, or Firm*—Stoneman Volk Patent Group; Martin L. Stoneman

(57) ABSTRACT

A cover plate system for making custom natural stone cover plates for electrical outlets, wall switches and other outlets and openings over which it is desired to place a natural stone cover plate. The natural stone cover plates are made from quarried stone, cultured stone, and natural rock materials such as terrazzo, marble, and granite preferably supplied by the homeowner, or end user, to a central factory, then manufactured, then shipped back to the end user to match other such material being used in the end user's building.

14 Claims, 10 Drawing Sheets

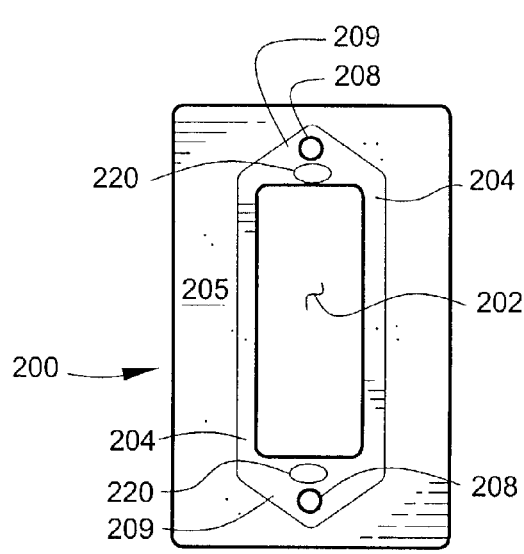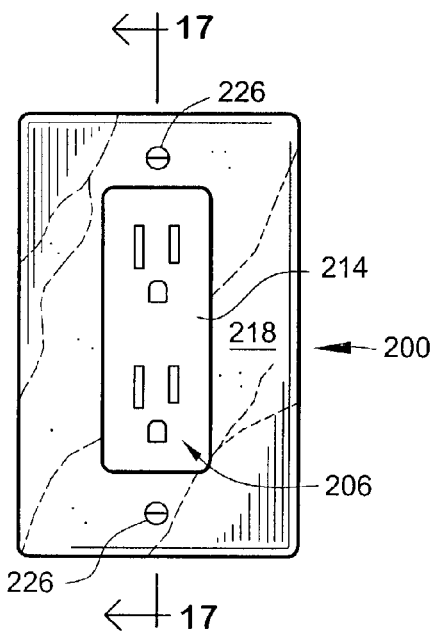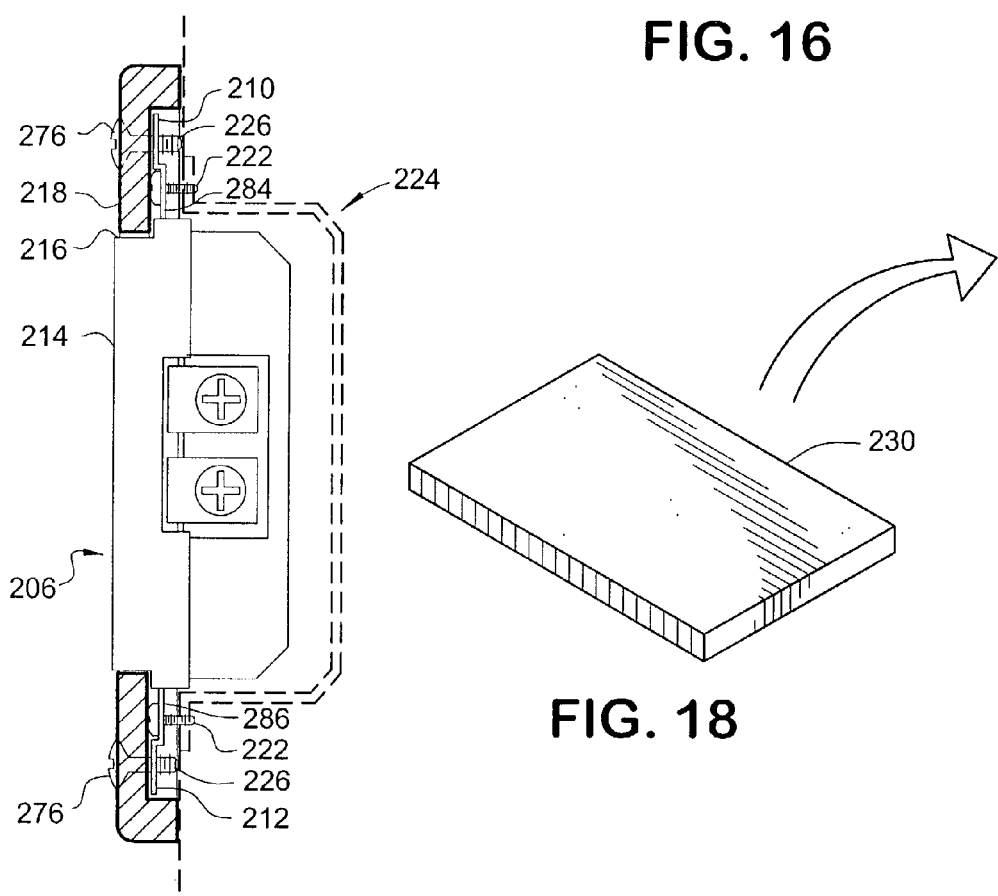
FIG. 15
FIG. 16
FIG. 17
FIG. 18

SYSTEM FOR MATCHED-STONE COVER PLATES

CROSS-REFERENCE TO RELATED APPLICATION

The present application is related to applicant's prior U.S. Provisional Application No. 60/305,210, filed Jul. 13, 2001, entitled "SYSTEM FOR MATCHED-STONE COVER PLATES", the contents of which are herein incorporated by reference and are not admitted to be prior art with respect to the present invention by their mention in this cross-reference section.

BACKGROUND

This invention relates to a cover plate system for making custom natural stone cover plates for electrical outlets, wall switches and other outlets and openings in which it is desired to place a natural stone cover. More particularly, this invention relates to such a system and method for providing such cover plates matching the natural stone(s), even the exact "lot" of such stones, used, e.g., as tiles for floors, countertops, etc., provided in a customer's residence or business location. The cover plates may be made from quarried stone, cultured stone, and natural rock materials such as terrazzo, marble, and granite and other stone-like brittle materials (the above materials all are herein referred to only as natural stone).

Typically, cover plates are standardized, with the size of the plates, outlet and switch openings and location of mounting holes being fixed for the majority of electrical outlets and switches. Cover plates are typically made of plastic, are inexpensive, and come in an extremely limited color selection. Homeowners or other users may desire to utilize expensive custom countertops, wall coverings or flooring made from natural stone. These materials typically cost thousands or tens of thousands of dollars. It is generally undesirable to select a plastic or plain cover plate and have it placed next to the expensive natural stone.

Heretofore, there have been a limited number of options for a more desirable cover plate. Some cover plates are pre-manufactured using wood, ceramic or other materials; however, persons desiring to match the custom natural stone installed in their building have little choice for cover plates. For example, U.S. Pat. No. 6,037,542 (further referred only as the '542 patent) provides for an upper substrate bonded to a lower substrate such as an existing standard cover plate. This patent does not provide a method for creating a solid natural stone cover plate using natural stone material supplied by the homeowner, or end user, to match other such material being used in the end user's building. Further the '542 patent does not disclose a method for reducing the thickness of natural stone nor a method of cutting such natural stone to match a standardized cover plate, but simply states that substrates must be cut, placed and adhered.

Natural stone is unique; and even natural stone pulled from the same quarry may vary in color and texture. Even further, natural stone may be very brittle and has a multitude of texture differences which make it a difficult product to manipulate. It is especially pertinent, that, for certain natural stones and stony materials, there will often be certain minimum dimensions required to work with such material without destruction or other breaking; thus, manufacturing techniques may be required beyond those for normal thin cover plates of other materials. Therefore, a need exists to manufacture cover plates from natural stone or other such quarry material made to match the material utilized in a user's rooms. These "tile" materials commonly are supplied in thickness of three-eighths inch to two inches thick; therefore a need exists to provide a method of reducing the thickness of the material to incorporate the cover plate onto the outlet. Further, a need exists to provide such natural stone cover plates which may be installed on any custom or standardized outlet and switch, including screw mounting holes.

OBJECTS OF THE INVENTION

A primary object and feature of the present invention is to provide a cover plate system for making custom cover plates from quarried stone, cultured stone, and natural rock materials such as terrazzo, travertine, marble, and granite or from "tiles" of said materials matching those used in a user's rooms.

It is a further object and feature of the present invention to provide such a system which utilizes a customer's materials (preferably supplied by the homeowner or end user) so as to match such material in both color and texture in making such cover plates.

It is a further object and feature of the present invention to provide such a system which will provide a method of cutting, shaping and drilling the material to incorporate the cover plate to be installed on any custom or standardized outlet and switch, including screw mounting holes.

A further primary object and feature of the present invention is to provide such a system which is efficient, inexpensive, and handy. Other objects and features of this invention will become apparent with reference to the following descriptions.

SUMMARY OF THE INVENTION

In accordance with a preferred embodiment hereof, this invention provides a system for providing at least one stony custom cover plate to at least one customer for use with at least one electrical box holding at least one electrical service device for use with such cover plate, comprising, in combination: providing at least one central factory for cover plate manufacture; advertising such cover plate manufacture over a wide area; arranging for placement of customer orders with such factory for a customer-specified number of fully-size-specified cover plates; arranging for receiving shipment at such factory of sufficient stony material matching the customer's hard surface décor ("tile" materials) for at least one particular area to permit manufacture of the ordered cover plates; manufacturing at such factory such ordered cover plates; and arranging for the manufactured cover plates to be delivered to the customer.

It also provides such a system further comprising: arranging for the return of factory-unused customer's material to the customer. And, provides such a system wherein such stony material comprises natural stone material.

In accordance with another preferred embodiment hereof, this invention provides a system for providing at least one stony custom cover plate to at least one customer for use with at least one electrical box holding at least one electrical service device for use with such cover plate, comprising, in combination: receiving a quantity of desired stony material; reducing each received item of such material so requiring down to at least one blank of a working width for easier handling; reducing the thickness of each such blank to a desired thickness for a desired such cover plate; reducing each such blank to at least one plate to provide the desired cover plate dimensions; drilling at least one hole through such thickness of such plate; machining out such at least one hole to form at least one larger aperture through such plate adapted to expose such at least one electrical service device for use; and buffing at least one plate edge.

Furthermore, it provides such a system wherein such stony material consists essentially of natural stone. It also provides such a system wherein such reducing down to blanks is accomplished using a common table saw. Even further, it provides such a system wherein such desired thickness is about one-eighth inch to about three-eighths inch. Still further, it provides such a system wherein such desired thickness is about three-eighths inch.

Moreover, it provides such a system further comprising: reducing such thickness of such plate adjacent such aperture, to form a recess, in such manner that, if such cover plate is attached over a particular such electrical service device having a particular outer contour, an outer surface of such cover plate is substantially aligned with an outer surface of such electrical service device. And, it provides wherein such recess is formed by routing.

Even further, it provides such a system wherein reducing the thickness of each such blank to a desired thickness for a desired such cover plate comprises, at least partially, grinding a rear unfinished surface of such plate, using a surface grinder, to achieve such desired thickness.

Additionally, it provides such a system comprising the following ordered steps: drilling at least one pilot hole for routing; routing such at least one such recess in such rear surface; drilling, in such front surface, at least one screw-mounting hole; chamfering such at least one screw-mounting hole; routing such at least one aperture; and chamfering at least one peripheral edge of such plate.

Still further it provides such a system wherein at least one jig is used to hold the plate during at least one such machining step. And, it provides such a system wherein: such desired thickness is about one-eighth inch to about three-eighths inch; and at least one jig is used to hold such plate during the machining step.

In accordance with another preferred embodiment hereof, this invention provides a stony-material article having a shape manufactured in accordance with the herein described processes.

In accordance with another preferred embodiment hereof, this invention provides a natural stone article having a shape manufactured in accordance with the herein described processes.

In accordance with yet another preferred embodiment hereof, this invention provides a system for providing custom cover plates, comprising: a product comprising entirely natural stone; wherein such product has a shape permitting efficient and aesthetic use, without further modification of such natural stone material, of such product as a wall cover plate using standard hardware and fitting standard electrical receptacle boxes. It also provides such a system further comprising associated standard hardware for installation.

Furthermore, it provides such a system wherein such product and hardware are in an installed condition; and, wherein such product comprises at least one aperture for electrical terminals; and further wherein such product comprises multiple apertures for electrical terminals. It even provides such a system wherein such product comprises at least one aperture for an attachment; and wherein such step of surface grinding comprises use of a vacuum-assisted chuck.

In accordance with still another preferred embodiment hereof, this invention provides a vacuum-assisted chuck comprising at least one substantially-hollow boxlike body wherein: at least one upper surface of such chuck comprises a set of apertures structured and arranged to hold, using a vacuum created from a wet/dry shop vacuum device, at least one stony custom cover plate during a surface grinding step. It also provides such a system further comprising a set of grooves connecting all of such set of apertures on such at least one upper surface of such chuck. And, it provides such a system wherein at least one stony custom cover plate comprises at least one natural stone cover plate.

BRIEF DESCRIPTION OF THE DRAWINGS

FIG. 15 is a rear view of a natural stone cover plate according to another preferred embodiment of the present invention.

FIG. 16 is a front view of the natural stone cover plate of FIG. 15.

FIG. 17 is a side view, partially in section, through section 17—17 of FIG. 16.

FIG. 18 is a perspective view of a blank natural stone plate illustrating a first step in a method of making the natural stone cover plate of FIG. 15 according to another preferred embodiment of the present invention.

DETAILED DESCRIPTION OF A PREFERRED EMBODIMENT OF THE INVENTION

Figure 1:
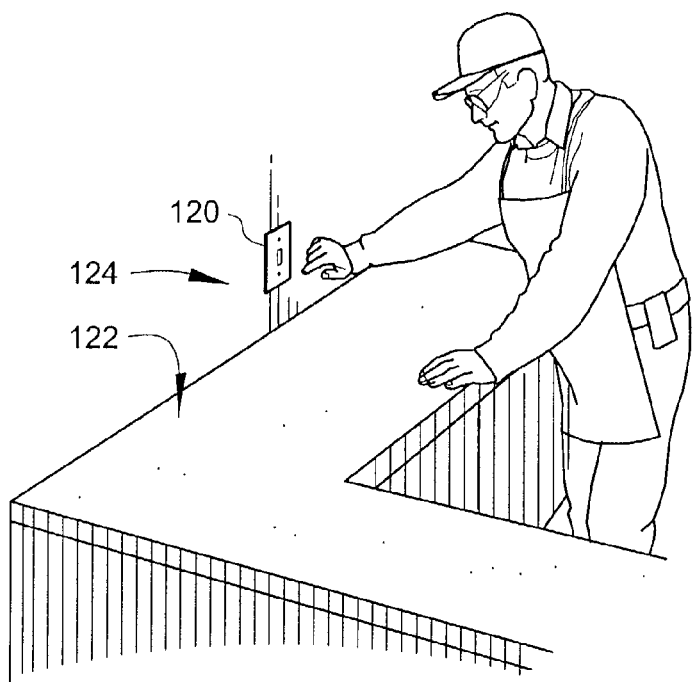
FIG. 1 is a perspective view of a cover plate installed above a custom natural stone counter top according to a preferred embodiment of the present invention.

Reference is now made to the drawings. FIG. 1 is a perspective view of a cover plate 120 of the cover plate system 124 installed above a custom natural stone counter top 122 according to a preferred embodiment of the present invention (embodying herein wherein such product and hardware are in an installed condition). Preferably, the present invention provides a cover plate system 124 for making custom cover plates for electrical outlets, wall switches and other such outlets. The cover plates are made from quarried stone, cultured stone, and natural rock materials such as terrazzo, marble, travertine and granite (the above materials are all herein referred to only as natural stone, however, embody herein a stony material). Preferably, the natural stone material is supplied by the homeowner, or end user, to match other such material being used in the end user's building.

The following description relates to all such cover plates, represented by two illustrated styles, cover plate 120 (see FIG. 2 and FIG. 13) and cover plate 200 (see FIG. 15) for representation purposes. Those knowledgeable in the art will recognize that there are multiple styles and sizes of such cover plates.

Figure 2:
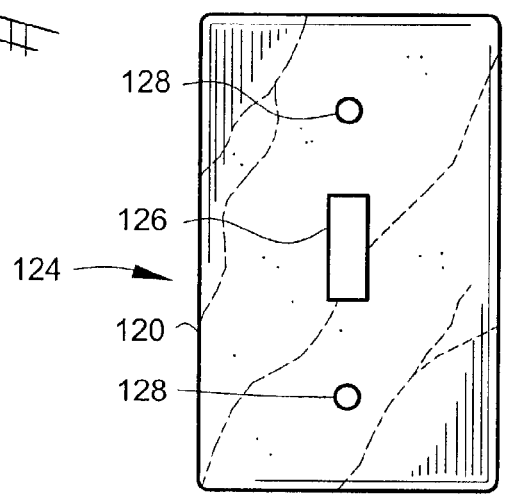
FIG. 2 is a front view of a natural stone cover plate according to a preferred embodiment of the present invention.

FIG. 2 is a front view of a natural stone cover plate 120 according to a preferred embodiment of the present invention. Preferably, cover plate 120 is sized in width and height similar to standard cover plates such as is well known in the art. Preferably, a standard off-the-shelf plastic cover plate is used to pattern the custom natural stone cover plate 120. Such cover plates typically have one or more aperture(s) 126 (embodying herein wherein such product comprises at least one aperture for electrical terminals; and embodying herein wherein such product comprises multiple apertures for electrical terminals), for the switch or electrical outlets(s) and one or more apertures 128 for attachment, typically by screws (embodying herein wherein such product comprises at least one aperture for an attachment). It is noted that the term aperture herein may include more than one aperture. It is also noted that all the associated hardware to install typical cover plates is intended to be used and included to install the natural stone cover plates of the present invention (embodying herein wherein such product has a shape permitting efficient and aesthetic use, without further modification of such natural stone material, of such product as a wall cover plate using standard hardware and fitting standard electrical receptacle boxes).

Figure 3:
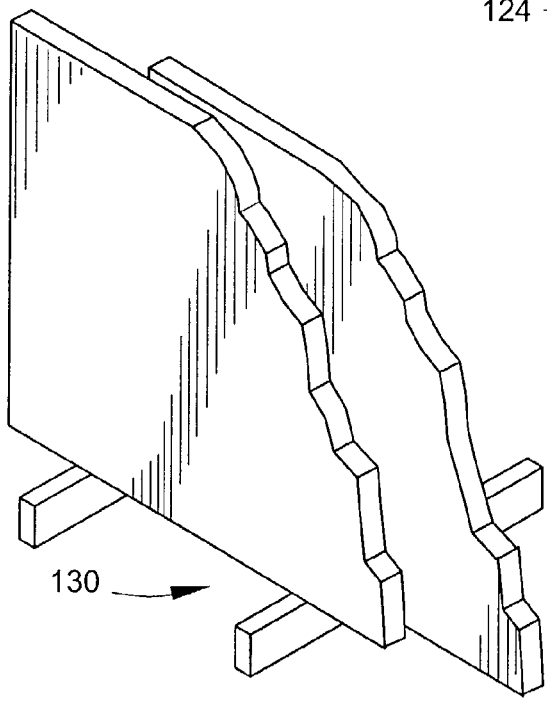
FIG. 3 is a perspective view of natural stone slab material as it is commonly shipped according to a preferred embodiment of the present invention.
Figure 4:
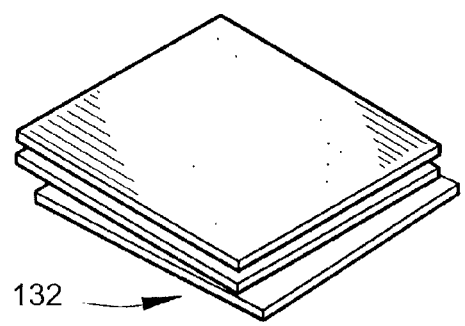
FIG. 4 is a perspective view of pre-cut natural stone material tiles as they are commonly shipped according to a preferred embodiment of the present invention.

FIG. 3 is a perspective view of natural stone slab(s) 130, such as quarried stone as it is commonly shipped according to a preferred embodiment of the present invention. FIG. 4 is a perspective view of pre-cut natural stone material tiles 132, such a marble and terrazzo as they are commonly shipped according to a preferred embodiment of the present invention. Typically, natural stone slabs 130 are provided in a thickness of one-half inch to two inches in thickness and very in size from about two to twenty-five square feet. Typically, pre-cut natural stone material tiles 132 are provided in three-eighths to three-quarter inch thicknesses and vary in size from about one to two square feet. Preferably, a cover plate 120 from natural stone should be milled to a thickness of about one-eighth of an inch to three-eighths of an inch to properly fit over a switch or outlet. The width and height of the cover plate 120 will vary depending on the size of the outlet box that the cover plate 120 will be attached to. Typically, such cover plates 120 range from a single plate (as illustrated) which covers a single gang electrical box, sized at about three inches in width by four and one-half inches in height, to a four gang box cover plate sized at about twelve inches wide by four and one-half inches in height.

Figure 5:
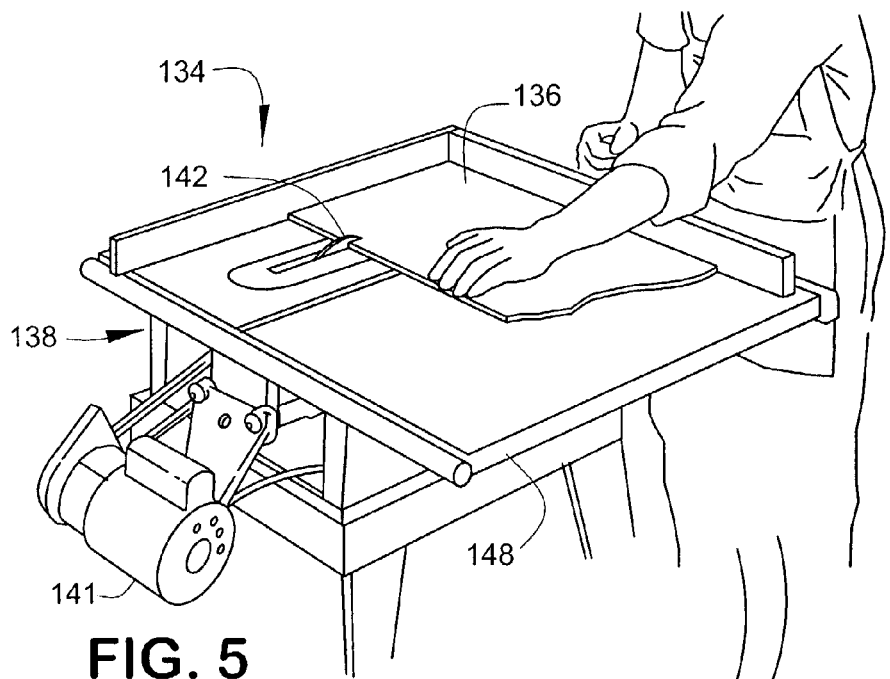
FIG. 5 is a perspective view of a step in the method of manufacturing the cover plates illustrating a first horizontal cutting process according to a preferred embodiment of the present invention.

FIG. 5 is a perspective view of a step in the method of manufacturing the cover plates 120 illustrating a first horizontal cutting process 134 according to a preferred embodiment of the present invention. Preferably, the natural stone slab 130 and/or the natural stone material tiles 132 are cut down to a working width by height dimension, such that the natural stone pieces 136 may be more easily handled after being received for processing at the manufacturing site (this arrangement embodies herein receiving a quantity of desired stony material). Such material may be very heavy and cumbersome to machine. Preferably, the natural stone pieces 136 are cut into a working piece called a blank 140 (as best illustrated in FIG. 7) with a table saw 138 as illustrated in FIG. 5 (this arrangement embodies herein reducing each received item of such material so requiring down to at least one blank of a working width for easier handling).

Preferably, the blanks 140 are cut to a working width of about three and one-half inches (based on whatever the finish height of the cover plate 120 is intended). The length of the blank 140 may vary depending on how many cover plates 120 are to be made from the blank 140. Preferably, a common table saw is used to cut the blanks 140 from the natural stone pieces 136 (embodying herein wherein such reducing down to blanks is accomplished using a common table saw). Such table saws are well known in the art and are most often used for woodworking. Preferably, the table saw has a large enough motor 141 to cut through the natural stone pieces 136 without binding. The exact horsepower may vary depending on the requirements of the specific natural stone piece 136, however a power range from about three-quarter horsepower to seven and one-half horsepower (with appropriate gearing) is generally sufficient. Preferably, the stone may be cut with either a wet method or dry method saw blade 142. Under appropriate circumstances, other cutting methods may suffice (such as a high pressure water saw used to cut the stone from a quarry). The preferred embodiment discussed herein is the best and least expensive method of cutting discovered to date by the applicant. In a wet method the saw blade 142 cuts the stone pieces utilizing a combination of a coolant (typically water) for cooling and a diamond blade. Such wet method saw blades typically have no cutting teeth and may be preferably used on materials that tend to chip using the dry method. In the dry method the saw blade 142 cuts the material without any coolant. Stone materials may respond differently to either method and as such the chosen method will depend on the preference of the user. In the illustrated embodiment a dry saw blade 142 is utilized. Preferably, the dry saw blade is a 60-tooth carbide blade typically used for cutting wood; however, those knowledgeable in the art could select, without undue experimentation, a multitude of available saw blades that would suffice.

Figure 6:
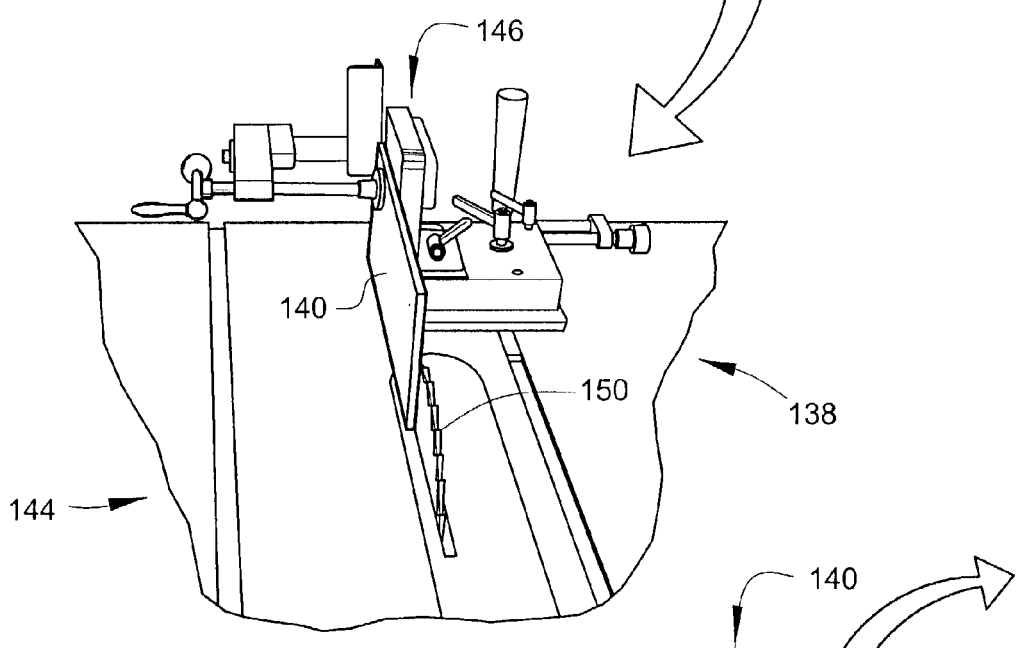
FIG. 6 is a perspective view of another step in the method of manufacturing the cover plates illustrating a first vertical cutting process according to a preferred embodiment of the present invention.

The next step in the method of manufacturing the cover plates 120 is illustrated in FIG. 6. FIG. 6 is a perspective view of another step in the method of manufacturing the cover plates 120 illustrating a first vertical cutting process 144 according to a preferred embodiment of the present invention. Preferably, the blank 140 is now cut or milled to the preferred thickness (embodying herein reducing the thickness of each such blank to a desired thickness for a desired such cover plate). In the illustrated embodiment of FIG. 6, the blank 140 is inserted into a holder 146. Holder 146 is preferably a mortise and tenon clamp which slidably attaches to the saw table 148 and is capable of holding the blank 140 in a substantially vertical position, as shown. Under appropriate circumstances other types of holders may suffice. Preferably, the saw blade is adjusted in height to accommodate the size of the blank 140. In the illustrated embodiment of FIG. 6, the blank 140 is of a height in which one-half will be cut at a time. The preferred manner in which the material is removed by the saw blade may vary depending on the type of blade used, size of the blade (8", 10", etc.) and horsepower of the motor 141. For example, if an eight-inch diameter saw blade 150 is used, a blank 140 that is three and one-half inches wide (vertical in the holder) could be milled wholly each pass of the saw blade 150; however, a blank 140 of four and one-half inches in height (similar to that illustrated in FIG. 6) would preferably be milled down by setting the height of the saw blade 150 such that one-half of the blank 140 width (vertical in the holder) would be milled each pass. Under appropriate circumstances, other sawing methods may suffice. Preferably, the blank 140 is pushed passed the saw blade 150 such that an increment of about one-sixteenth to one-eighth of an inch of the blank 140 material is removed on each pass. Preferably, the sawing process continues until this blank 140 is the desired thickness (dimension). Preferably, the desired thickness is about one-eighth inch to about three-eighths inch. Most preferably, about three-eighths inch (embodying herein such desired thickness is about one-eighth inch to about three-eighths inch).

Figure 7:
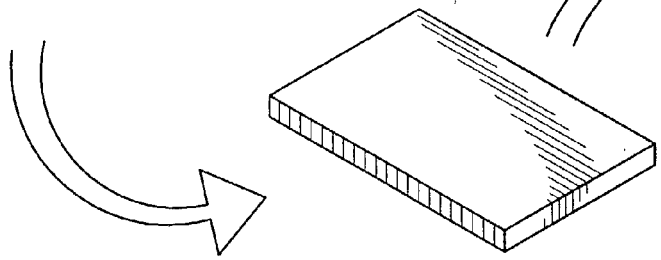
FIG. 7 is a perspective view of a sized blank cover plate created by the method of manufacturing the cover plates resulting from a second horizontal cutting process according to a preferred embodiment of the present invention.

FIG. 7 is a perspective view of a sized blank cover plate 140 created by the method of manufacturing the cover plates resulting from a second horizontal cutting process according to a preferred embodiment of the present invention. Preferably, after the blank has been milled, the actual cover plate 120 size is cut by using the table saw 138 in a second horizontal cutting process resulting in a sized blank cover plate 140 (this arrangement embodies herein reducing each such blank to at least one plate to provide the desired cover plate dimensions).

Figure 8:
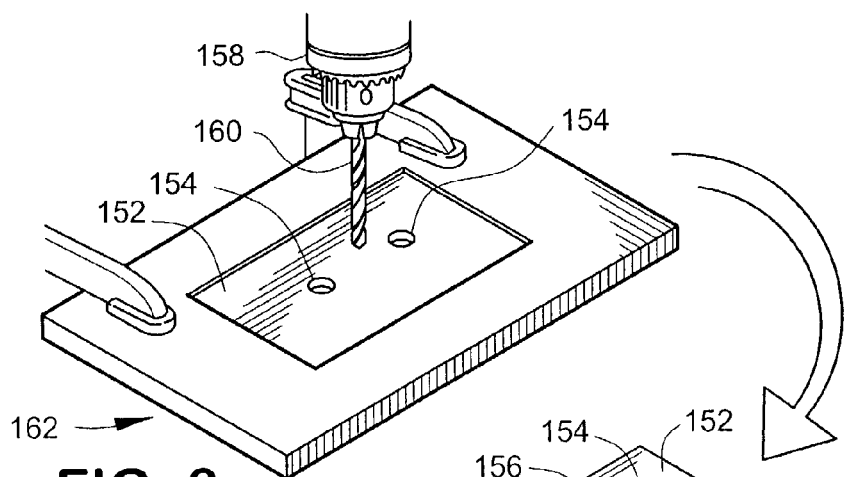
FIG. 8 is a perspective view of yet another step in the method of manufacturing the cover plates illustrating the drilling of pilot and screw holes according to a preferred embodiment of the present invention.

FIG. 8 is a perspective view of yet another step in the method of manufacturing the cover plate 120 illustrating the drilling of pilot holes 154 and aperture 156 according to a preferred embodiment of the present invention (embodying herein drilling at least one hole through such thickness of such plate). Preferably, the next step in the method of manufacturing the cover plates 120 is to utilize a drill press 158 and drill bits 160 to drill the pilot holes 154 and aperture 156. Preferably blank 140 is set in a jig 162 (a term used in the art to describe a device used to maintain mechanically the correct positional relationship between a piece of work and the tool or between parts of work during assembly) made to hold the blank 140 motionless and in such a location as to match the jig 164 and which corresponds to the apertures 168 and aperture 172 on standard cover plate 166 used as a pattern and illustrated in FIG. 9 (the above arrangement embodies herein at least one jig is used to hold such plate during the machining step). Preferably, the aperture 156 is drilled first through the front face to assist in preventing breakage in the blank 140 and future machining. The aperture 156 will become aperture 128 when the cover plate 120 is finished. The aperture 156 is typically used to insert a connector such as a screw through the aperture 156 and then thread the screw into an electrical outlet box (this arrangement embodies herein drilling, in such front surface, at least one screw-mounting hole). Such connections are well known in the art. Preferably, aperture(s) 156 has a slight countersink (not shown) applied on the blank front face 152, also machined by the drill press 158. The countersink (chamfer) is applied to allow the screw to set flush with the face of the finished cover plate 120 (this arrangement embodies chamfering such at least one screw-mounting hole). Preferably, the aperture 156 is about six-thirty-seconds ($6/32$) of an inch in diameter to fit the majority of commonly used electrical screws. The selection of a drill bit 160 to drill such a diameter aperture 156 is well known by those knowledgeable in the art and will not be further discussed. Under appropriate circumstances other connection methods of attaching the cover plate 120 to an electrical outlet box or other desired device may suffice without detracting from the present invention.

Preferably, the next step in the method of manufacturing the cover plates 120 is to drill pilot holes 154 for the future step of using a router 180 (see FIG. 11) or other similar machining tool to cut out the apertures 126. Preferably, such pilot holes 154 are located by centering the drill bit 160 in the location of the future apertures 126 which correspond to the apertures 168 on standard cover plate 166 used as a pattern and illustrated in FIG. 9. Preferably, the pilot holes 154 are sized to allow the cutting bit of the router 180 to pass through them (the above-described arrangement embodies herein drilling at least one pilot hole for routing). Subsequent to the completion of the drilling, the blank 140 will be referred to as unfinished cover plate 170.

Figure 9:
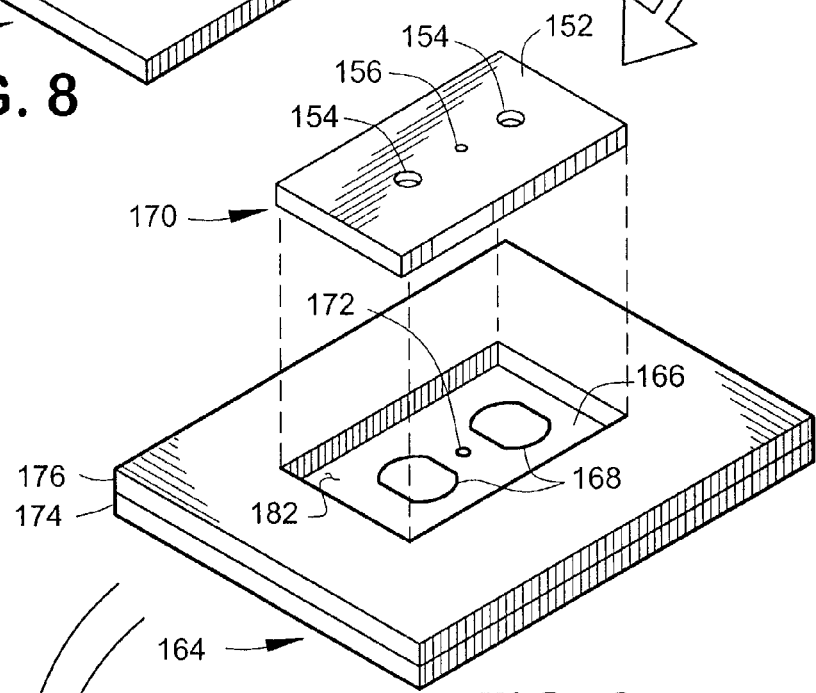
FIG. 9 is a perspective view of still another step in the method of manufacturing the cover plates illustrating use of a custom jig in combination with a standard cover plate as a pattern according to a preferred embodiment of the present invention.
Figure 10:
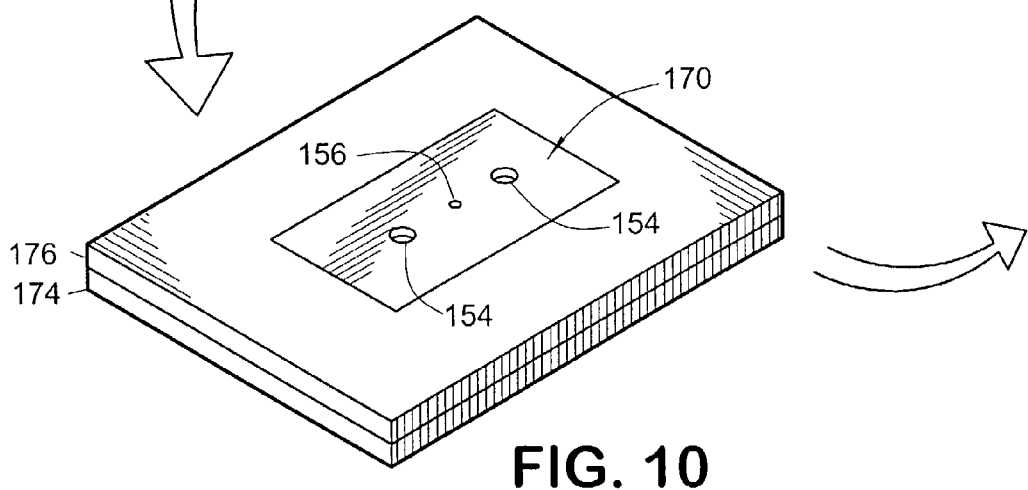
FIG. 10 is a perspective view of a further step in the method of manufacturing the cover plates illustrating use of the custom jig of FIG. 9 according to a preferred embodiment of the present invention.
Figure 11:
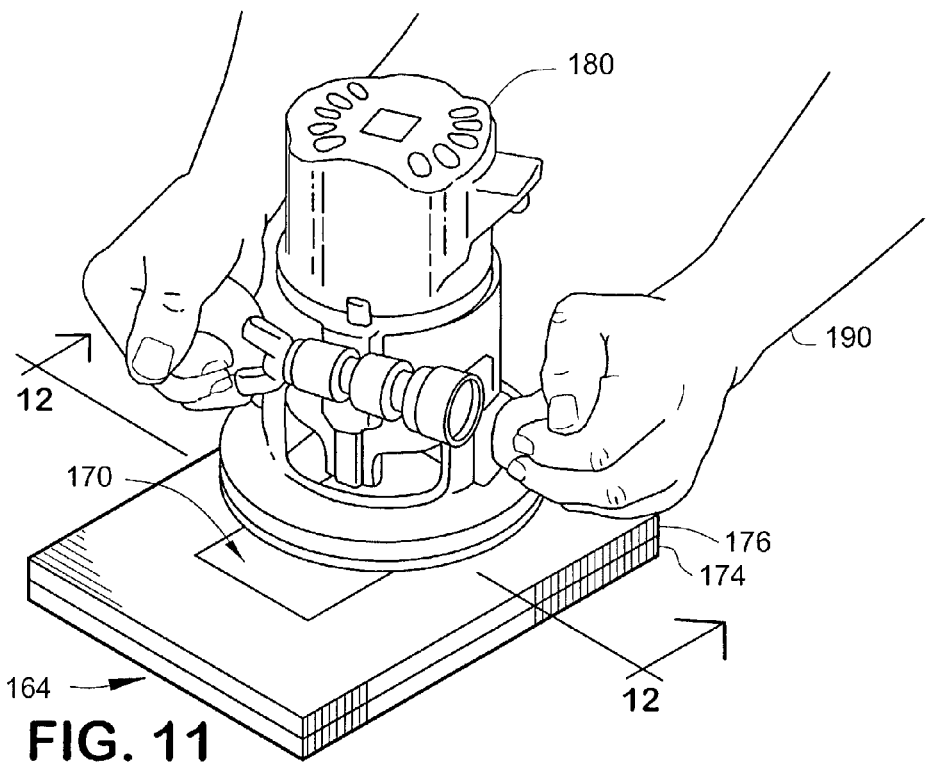
FIG. 11 is a perspective view of a further step in the method of manufacturing the cover plates illustrating use of a router (a preferred machine tool) in combination with the custom jig of FIG. 10 according to a preferred embodiment of the present invention.

Reference is now made to FIGS. 9–11. FIG. 9 is a perspective view of still another step in the method of manufacturing the cover plate 120 illustrating use of a custom jig 164 in combination with a standard cover plate 166 (referring herein to any cover plate which is desired to be used as a pattern for the cover plate 120) as a pattern according to a preferred embodiment of the present invention. FIG. 10 is a perspective view of a further step in the method of manufacturing the cover plate 120 illustrating use of the custom jig 164 of FIG. 9 according to a preferred embodiment of the present invention. Preferably, unfinished cover plate 170 is removed from jig 162 and placed in jig 164, as illustrated in FIG. 9 and FIG. 10.

FIG. 11 is a perspective view of a further step in the method of manufacturing the cover plate 120 illustrating use of a router 180 (for machining) in combination with the custom jig 164 of FIG. 10 according to a preferred embodiment of the present invention. Preferably, unfinished cover plate 170 is removed from jig 162 and placed in jig 164, as illustrated in FIG. 9 and FIG. 10.

Preferably, jig 164 comprises two layers 174 and 176. Preferably, layer 174 comprises an opening 178 which is cut to hold a standard cover plate 166, as shown (also see FIG. 12). Preferably, layer 174 comprises a standard cover plate 166. Preferably, layer 176 comprises an opening 182 which is cut to hold unfinished cover plate 170. Preferably, the opening 178 and opening 182 are equal in size. Under appropriate circumstances other arrangements may suffice. Preferably, jig 164 is clamped or held in place such that a router 180 or other appropriate machining tool may be used to cut cover plate 170 while placed in jig 164. Similar clamping means are well known by those skilled in the art.

Preferably, router 180 utilizes a straight cutting blade 184 with a bearing 186, also known in the art as a flush trim bit 188. Selection of a proper size is dependent on the router tool and aperture size to be cut and such selection may be readily made by those skilled in the art. For example, a one-half horsepower router using a one-quarter inch shank cutting an outlet aperture such as illustrated in FIG. 9 would preferably use a flush trim bit with a one-quarter inch shank having a three-eighths inch cutting diameter and a one-half inch cutting length.

Figure 12:
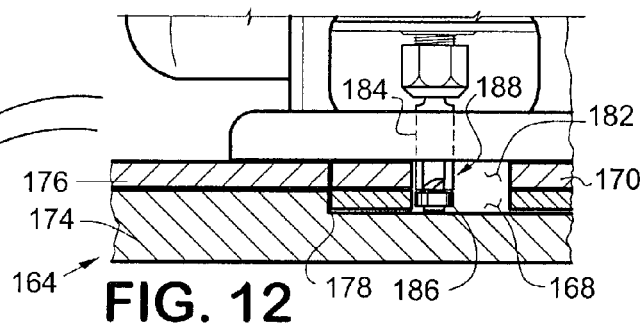
FIG. 12 is a sectional view through section 12—12 of FIG. 11.

FIG. 12 is a sectional view through section 12—12 of FIG. 11. Preferably, a user 190 (or an appropriate computer program) directs router 180 such that the bearing 186 rides along the standard cover plate 166 apertures 168 and assists in guiding the cutting blade 184 such that the cutting blade 184 only removes or cuts the desired material from the unfinished cover plate 170. Such routing skill is well known by those knowledgeable in the art and is quite common in the woodworking industry.

Figure 13:
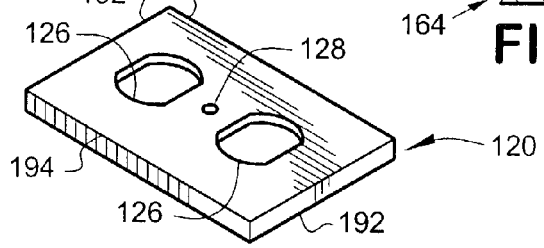
FIG. 13 is a perspective view of a cover plate after being removed from the jig of FIG. 11 according to a preferred embodiment of the present invention.
Figure 14:
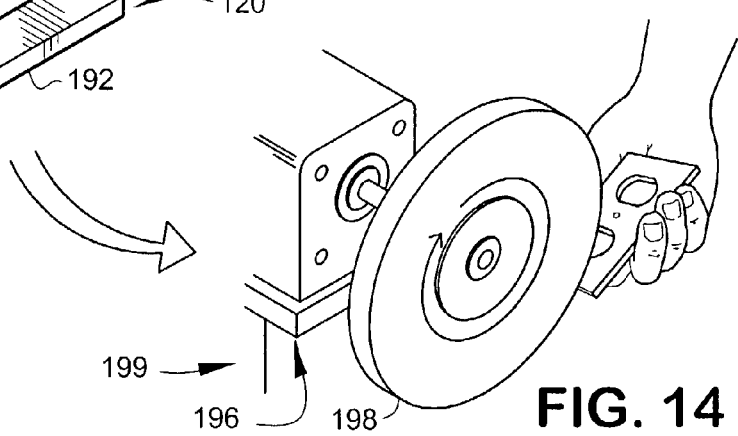
FIG. 14 is a perspective view of the last step in finishing the cover plate according to a preferred embodiment of the present invention.

FIG. 13 is a perspective view of a cover plate 120 after being removed from the jig 164 of FIG. 11 according to a preferred embodiment of the present invention. FIG. 14 is a perspective view of the finishing step 199 in finishing the cover plate 120 according to a preferred embodiment of the present invention. Preferably, the cover plate 120 is now ready for finishing. Preferably, the edges 192 and 194 are either rounded or eased using either a router 180 with a rounding bit (not shown) or a polishing/grinder tool 196 as shown in FIG. 14 embodying herein chamfering at least one peripheral edge of such plate). Preferably, by utilizing varying abrasive grit and polishing pads 198 that may be attached to the polishing/grinder tool 196, the cover plate 120 may be finished as desired. Because each natural stone material reacts differently and each user 190 may desire to apply more or less effort into the finishing step 199 process, the grit and time will vary to accomplish this last step. Preferably, an abrasive grit from about 40 to about 50,000 microns is used in the sanding and polishing of the finishing step 199 (this arrangement embodies herein buffing at least one plate edge).

Recently, manufacturers of outlets, and some switches, have started to make such outlets and switches with a unitary front plate rather than separate portions, as had been the standard in the past. Consequently, cover plates are required with a singular, typically larger, opening through which such outlets and plates may fit. The below described embodiment is directed towards natural stone cover plates for use with such singular openings but may also be used, under appropriate circumstances, with other styles of cover plates.

FIG. 15 is a rear view of a natural stone cover plate 200 according to another preferred embodiment of the present invention. FIG. 16 is a front view of the natural stone cover plate 200 of FIG. 15. FIG. 17 is a side view, partially in section, through section 17—17 of FIG. 16. (The above-described Figures embody herein a stony-material article having a shape manufactured in accordance with the processes described herein; and embodying herein a natural stone article having a shape manufactured in accordance with the processes described herein).

Preferably, in this embodiment, the natural stone cover plate 200 has a singular central opening 202 large enough to allow a standard outlet 206 (or switch) to fit through, as shown (embodying herein wherein such product comprises at least one aperture for electrical terminals). Preferably, the central opening 202 has a recessed portion 204 on the back face 205 (which is an unpolished face) surrounding the exterior perimeter of the central opening 202, as shown. The recessed portion 204 may be substantially rectangular; however, it is most preferable to provide a triangular portion 209 for the upper and lower screw attachments 210 and 212 respectively, on the outlet 206, as shown. Typically, the outlet 206 has a front face 214 and a recess 216 that allows a cover plate to set flush with the front face 214, as shown (see FIG. 17). Most preferably, the recess portion 204 is cut into the natural stone cover plate 200 such that recess portion 204 provides that the outlet 206 will fit onto the natural stone cover plate 200 and in the recess portion 204 such that the front face 214 is about flush with the front face 218 of the natural stone cover plate 200, as shown (the front face being typically and preferably a polished stone face). The above described arrangement embodies herein reducing such thickness of such plate adjacent such aperture, to form a recess, in such manner that, if such cover plate is attached over a particular such electrical service device having a particular outer contour, an outer surface of such cover plate is substantially aligned with an outer surface of such electrical service device.

Preferably, the natural stone cover plate 200 also includes two screw-apertures 208, preferably located to align with the most standard screw holes of an outlet 206 (as previously described above). Under appropriate circumstances, other arrangements may suffice. For example, the outlets and cover plates come in a variety of sizes and combinations. Since the preferred embodiment is custom-made to fit the users requirements, it is noted that the description herein may be modified to accommodate other styles and types of outlets and switches.

Preferably, the natural stone cover plate 200 also includes two screw recesses 220 to accommodate the screws 222 typically used to attach an outlet 206 to an electrical wiring box 224, typically attached to a wall stud within a wall. Providing the recesses 220 reduces the possibilities of cracking the natural stone cover plate 200 when tightening the screws 226 used to attach the natural stone cover plate 200 to the outlet 206, as shown.

FIG. 18 is a perspective view of a blank natural stone plate 230 illustrating a first step in a method of making the natural stone cover plate 200 of FIG. 15 according to another preferred embodiment of the present invention. Preferably, the above-described method illustrated in FIGS. 3 through 5 is utilized to provide a blank natural stone plate 230.

Figure 19:
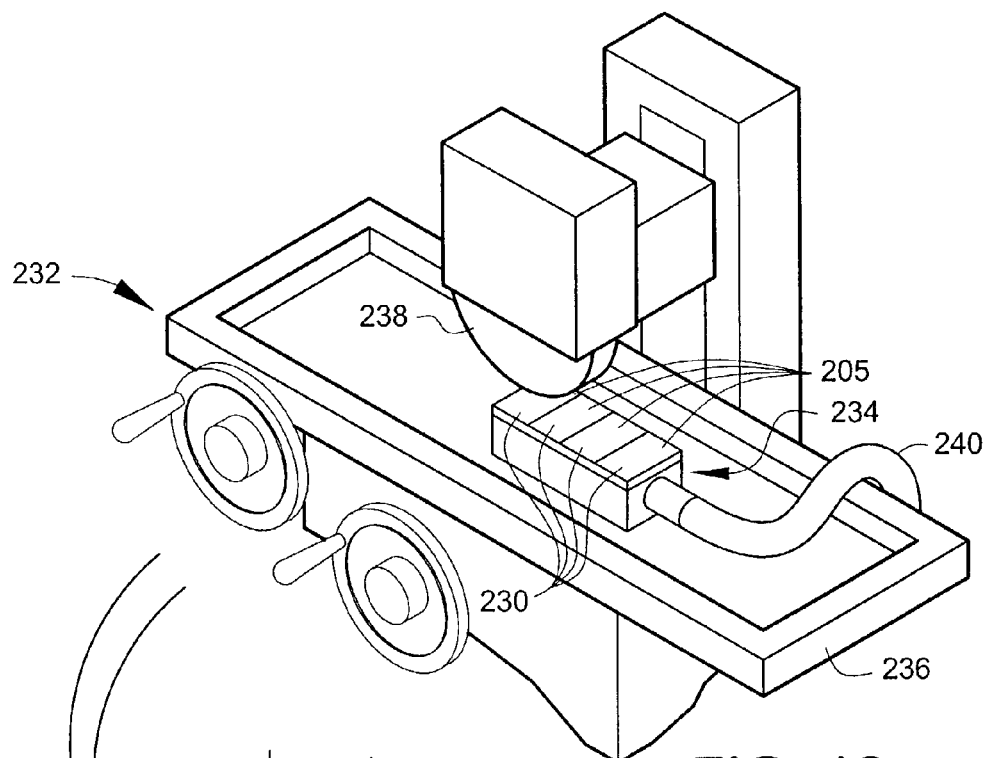
FIG. 19 is a perspective view of another step in the method of making the natural stone cover plate of FIG. 15 illustrating a method of reducing the thickness of the stone utilizing horizontal grinding of the blank plate.

FIG. 19 is a perspective view of another step in the method of making the natural stone cover plate 200 of FIG. 15 illustrating a method of reducing the thickness of the stone utilizing horizontal grinding of the blank plate.

Preferably, in this embodiment, the method used to reduce the thickness of the stone is augmented utilizing a surface grinding machine 232 in lieu of, or in addition to, the vertical sawing of FIG. 5. Applicant has found that use of a vacuum assisted chuck 234 greatly enhances the efficient use of such a surface grinding application and has designed a specific such vacuum assisted chuck 234 that will be further described in FIG. 31 and FIG. 32. Preferably, the vacuum assisted chuck 234 is designed to hold four blank natural stone plates 230 at a time. Under appropriate circumstances, other arrangements may suffice.

Preferably, four such blank natural stone plates 230 are placed on the vacuum assisted chuck 234 (or other such holding device). Typically, such a surface grinding machine 232 has a slidable table 236 which moves in three axis: left/right, up/down and in/out such that the surface of the material to be reduced (in this case the blank natural stone plates 230) may be moved in the three axis underneath the grinding wheel 238. It is also preferable that the grinding machine 232 includes a magnetic chuck. Preferably, the magnetic chuck is used to hold the vacuum assisted chuck on the slidable table 236. Preferably, the grinding wheel 238 has diamond grit for removing stone. Such grinding machines 232 may be hand-operated or computer-controlled. Furthermore, such grinding machines 232 may be water-assisted (for cooling) during the grinding operation or dry (air cooled). Most preferably, a water-assisted grinding machine is used to grind (cut) the blank natural stone plate 230 along with the diamond-grit grinding wheel 238 (embodying herein wherein reducing the thickness of each such blank to a desired thickness for a desired such cover plate comprises, at least partially, grinding a rear unfinished surface of such plate, using a surface grinder, to achieve such desired thickness). Preferably, the vacuum assisted chuck 234 is connected to an outdoor shop vacuum by a hose 240, as shown. Preferably, the vacuum assisted chuck 234 holds the blank natural stone plates 230 firmly in place during grinding of the blank natural stone plates 230 to the desired thickness (embodying herein wherein such step of surface grinding comprises use of a vacuum-assisted chuck). Preferably, the blank natural stone plates 230 are placed face down (the blank natural stone plates 230 have a polished shiny front face).

Figure 20:
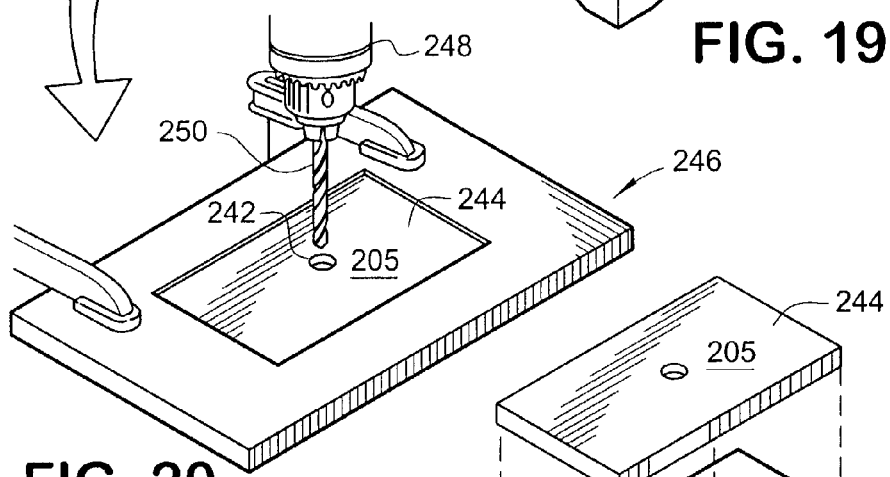
FIG. 20 is a perspective view of another step in the method of making the natural stone cover plate of FIG. 15 illustrating drilling of a center pilot hole.

FIG. 20 is a perspective view of another step in the method of making the natural stone cover plate 200 of FIG. 15 illustrating drilling of a center pilot hole 242. Preferably, after grinding, the now properly sized-to-thickness plate 244 is placed into a jig 246 (as stated earlier, a device used to maintain mechanically the correct positional relationship between a piece of work and the tool or between parts of work during assembly) which is specifically sized to hold the plate 244, as shown. Preferably, the jig 246 is then clamped onto a drill press or in a position to be drilled, as shown. Preferably, a drill 248 and drill bit 250 are used, in well-known ways, to drill a pilot hole (a term commonly used in the art to describe a starter opening; used herein for placement of a router cutting bit). Preferably, the drill 248 is a standard electric drill about one-half horsepower. Preferably, the drill bit 250 is a diamond core drill bit, preferably about three-quarter inch in diameter for use with a one-half inch to three-quarter inch diameter diamond core router bit. Under appropriate circumstances, other drill 248 horsepower or drill bit 250 diameters may suffice.

Figure 21:
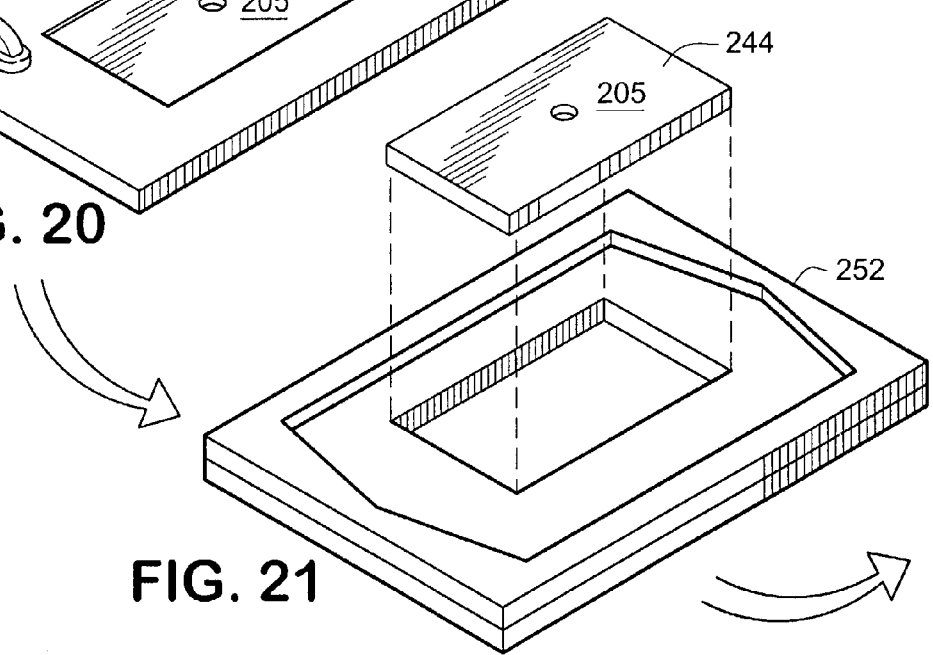
FIG. 21 is a perspective view of yet another step in the method of making the natural stone cover plate of FIG. 15 illustrating use of a routing jig.
Figure 22:
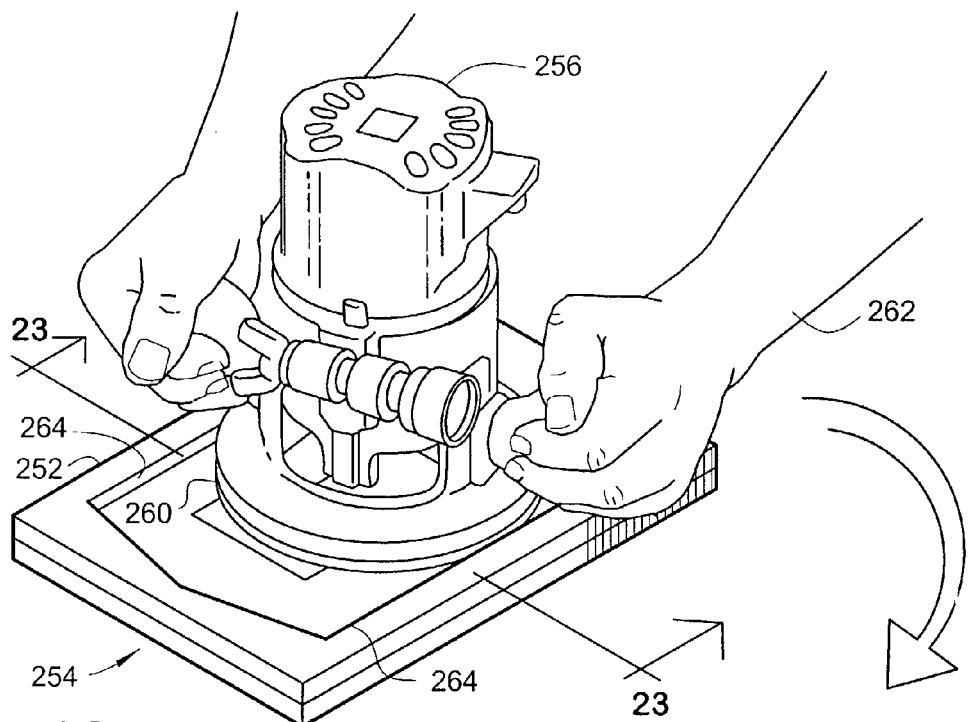
FIG. 22 is a perspective view of yet another step in the method of making the natural stone cover plate of FIG. 15 illustrating use of a router.
Figure 23:
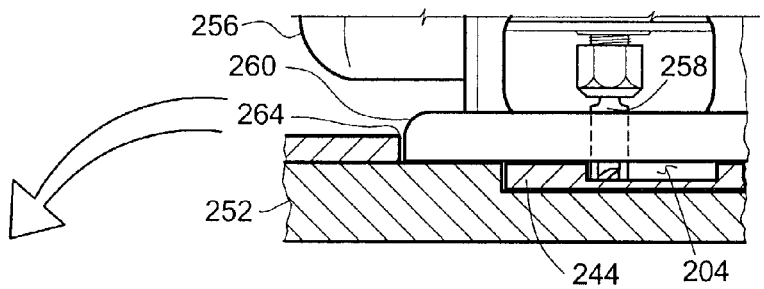
FIG. 23 is a sectional view through section 23—23 of FIG. 22.

FIG. 21 is a perspective view of yet another step in the method of making the natural stone cover plate 200 of FIG. 15 illustrating use of a routing jig 252. Preferably, the plate 244 with the pilot hole 242 is now placed into a routing jig 252, as shown. Preferably, the routing jig 252 is clamped or held in placed such that it will not move during the routing operation 254. FIG. 22 is a perspective view of yet another step, the routing operation 254, in the method of making the natural stone cover plate 200 of FIG. 15 illustrating use of a router 256. FIG. 23 is a sectional view through section 23—23 of FIG. 22. Preferably, a router 256 with an attached router bit 258 is used, in well-known ways by those knowledgeable in the art, to cut recess 204 into the plate 244, as shown. Preferably, about three-sixteenths of an inch of material is milled away by the router 256 for the recess 204 (when a three-eighths overall plate thickness is used). Such a jig 252 commonly utilizes the inner perimeter 258 of the jig 252 to guide the router base 260 as a user 262 moves the router base 260 around the inner perimeter 264 of the jig 252, as shown. As the router base 260 is moved around the inner perimeter 264, the router bit 258 cuts a pattern in the plate 244 (embodying herein routing such at least one such recess in such rear surface; and embodying herein machining out such at least one hole to form at least one larger aperture through such plate adapted to expose such at least one electrical service device for use). Under appropriate circumstances, other jig 252 arrangements may suffice as long as the cutting function is maintained.

Preferably, the router 256 is at least a one-half horsepower electric router utilizing a one-half inch chuck. Preferably, the router bit is a three-quarter inch diamond tipped flush-trim router bit (with or without a guide bearing) utilizing a one-half inch shank. Under appropriate circumstances, other horsepower, bit types or sizes may suffice.

Figure 24:
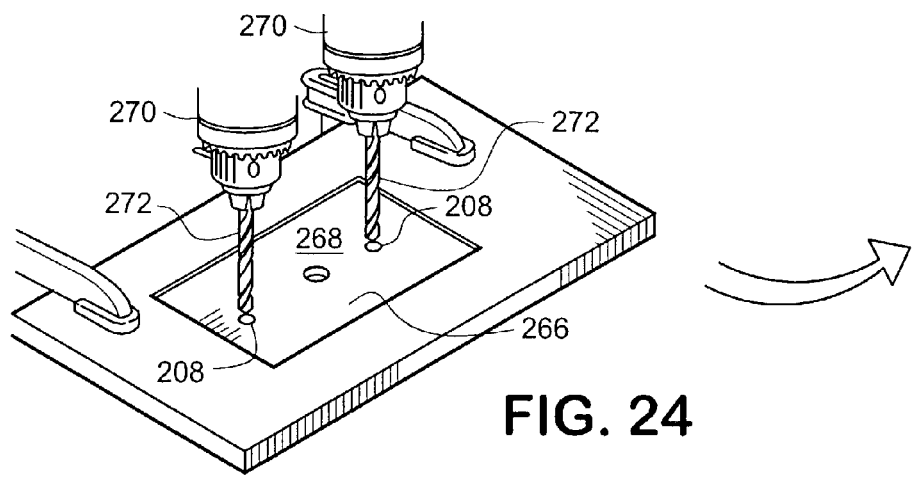
FIG. 24 is a perspective view of another step in the method of making the natural stone cover plate of FIG. 15 illustrating drilling of screw holes and screw recesses.

FIG. 24 is a perspective view of another step in the method of making the natural stone cover plate 200 of FIG. 15 illustrating drilling of screw holes 208. Preferably, the cover plate 266 having a recess on the back face 205 (the unpolished face) is now placed into another drilling jig front face 268 (the polished face) facing up. Preferably, a pair of drills 270 and drill bits 272 are set up to be adjusted to the preferred screw spacing for a typical cover plate (about four inches) attachment to an electrical device (for example outlet 206) and used to cut through the front face 205 of the cover plate 266 to create screw holes 208. Preferably, both drills 270 are one-half horsepower electric drills each respective drill preferably using a one-eighth inch diameter diamond core drill bit 272. Preferably, a second drill bit is then inserted into each respective drill to create a recess into which the screw head 276 (illustrated in FIG. 17) may fit.

Preferably, the second drill bit is a diamond chamfer bit. Preferably, an approximately one-quarter-inch diameter recess is created for the screw head 276. Under appropriate circumstances, other arrangements to drill and recess the screw holes 208 may suffice. For example, those knowledgeable in such art may choose to use a singular drill or a set of drills for drilling and recessing the screw holes 208.

Figure 25:
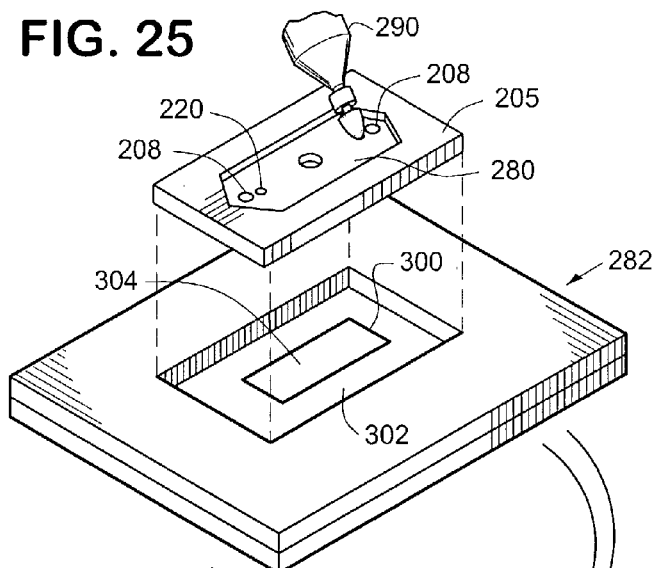
FIG. 25 is a perspective view of yet another step in the method of making the natural stone cover plate of FIG. 15 illustrating drilling of screw recesses and use of another jig.

FIG. 25 is a perspective view of yet another step in the method of making the natural stone cover plate 200 of FIG. 15 illustrating drilling of screw recesses 220 and use of another jig 282. Preferably, the cover plate 280 (now with screw holes 208) is turned rear face 205 facing upward in jig 282, as shown. Preferably, an upper recess 284 and lower recess 286 is formed to provide a space for the screws 222 (shown in FIG. 17) which are used to attach the outlet (or other electrical device) to an electrical wiring box 224, as shown. Preferably, a Dremel® tool 290 is used to create the recesses 220, as shown. Under appropriate circumstances, other tools may suffice.

Figure 26:
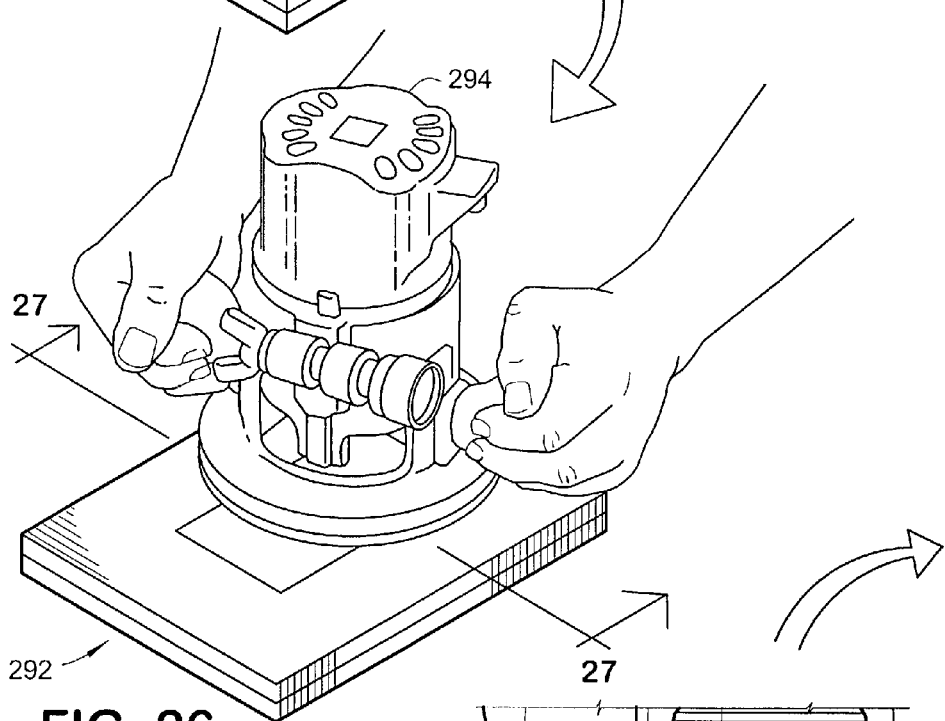
FIG. 26 is a perspective view of another step in the method of making the natural stone cover plate of FIG. 15 illustrating another routing step.
Figure 27:
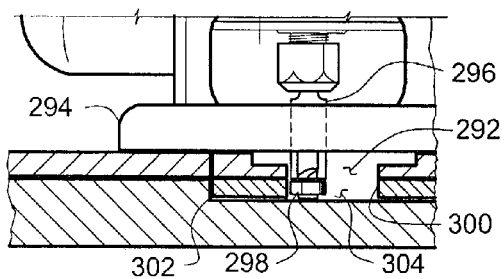
FIG. 27 is a sectional view through section 27—27 of FIG. 26.

FIG. 26 is a perspective view of another step in the method of making the natural stone cover plate 200 of FIG. 15 illustrating another routing step 292. FIG. 27 is a sectional view through section 27—27 of FIG. 26. Preferably, step 292 is utilized to cut out the central opening 202 (embodying herein wherein such recess is formed by routing). Preferably, an electric router 294 including a flush trim router bit 296 having a guide bearing 298 is used, as shown. Preferably, the guide bearing 298 or tracing bushing (not shown) is moved around the inner perimeter 300 of a lower plate 302 having an opening 304, as shown. Use of such a jig 282 is well known by those knowledgeable in the art of using a router.

Preferably, the router 294 is at least a one-half horsepower electric router utilizing a one-half inch chuck. Preferably, the router bit 296 is a three-quarter inch diamond tipped flush-trim router bit with a guide bearing utilizing a one-half inch shank. Under appropriate circumstances, other horsepower, bit types or sizes may suffice.

Figure 28:
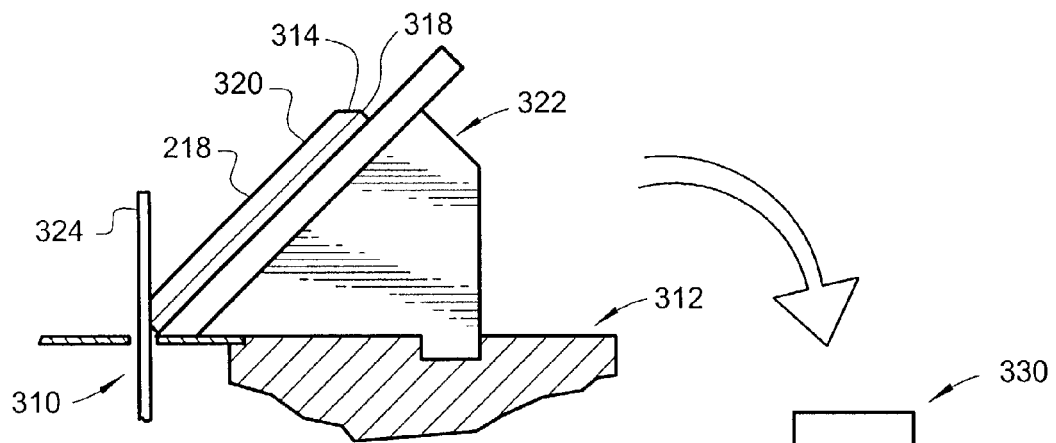
FIG. 28 is a side view, partially in section, of another step in the method of making the natural stone cover plate of FIG. 15 illustrating use of a saw for beveling the edges of the cover plate.

FIG. 28 is a side view, partially in section, of another step 310 in the method of making the natural stone cover plate 200 of FIG. 15 illustrating use of a typical table saw 312 for beveling the edges of the cover plate. Preferably, the natural stone cover plate 200 has a beveled edge 314 or rounded edge 316 along the outer perimeter 318 of the plate 320, as shown. A user may order either or a combination of both. Preferably, the outer perimeter 318 of the plate is beveled using a jig 322 that will hold the plate 320 at the desired angle as it is pushed across a saw blade 324 of a typical table saw 312, as shown. Preferably, the plate 320 is placed front face 218 face up and pushed along the saw blade 324. Under appropriate circumstances, other arrangements may suffice.

Figure 29:
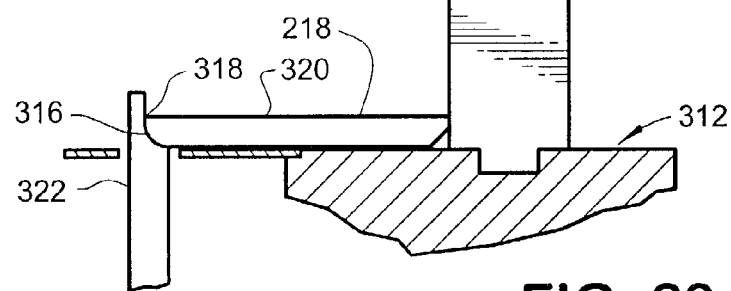
FIG. 29 is a side view, partially in section, of another step in the method of making the natural stone cover plate of FIG. 15 illustrating use of a saw for rounding the edges of the cover plate.

FIG. 29 is a side view, partially in section, of a step in the method of making the natural stone cover plate 200 of FIG. 15 illustrating use of a saw for rounding the edges of the cover plate 320. Preferably, as described above a jig 330 is used to hold the cover plate 320 at the desired angle as it is pushed across a radius cutter saw blade 322 of a typical table saw 312 to create a rounded edge 316, as shown. Preferably, the rear face 218 is placed facing up when cutting the rounded edges 316, as shown. Under appropriate circumstances, other arrangements may suffice, however, applicant has discovered the preferred method reduces chipping of the stone.

It is noted that both a rounded edge 316 and the beveled edge 314 may be used together or separate on the same cover plate.

Figure 30:
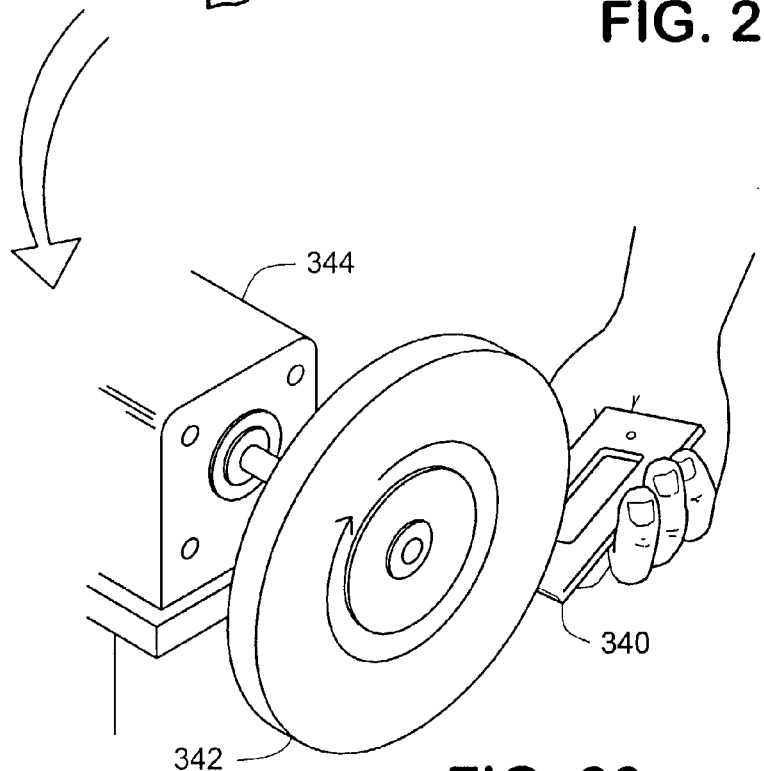
FIG. 30 is a perspective view of a final step in the method of making the natural stone cover plate of FIG. 15 illustrating a polishing means.

FIG. 30 is a perspective view of a final step in the method of making the natural stone cover plate 200 of FIG. 15 illustrating a polishing means. The final step in the manufacturing method is to polish or buff the entire cover plate 340, as shown. Preferably, a buffer pad 342 is used with a buffing wheel 344. Such machines are common.

It is noted that polishing of natural stone surfaces varies with the stone and desired degree of polish. Those knowledgeable in such art will, without undue experimentation, easily derive appropriate buffing grit and polishing times to achieve the desired polish. Applicant has found a buffer with a one-third to three horsepower motor is preferable. Further, Applicant prefers utilizing a buffing wheel speed of between about 400 and 3400 RPM in conjunction with buffing pads of between about 100 and 8500 grit, to achieve a preferable polish on most natural stone. However, as the polish is custom and selected by the user, other arrangements may be selected without detracting from the intended result (for example, those described in the alternate embodiments above).

Figure 31:
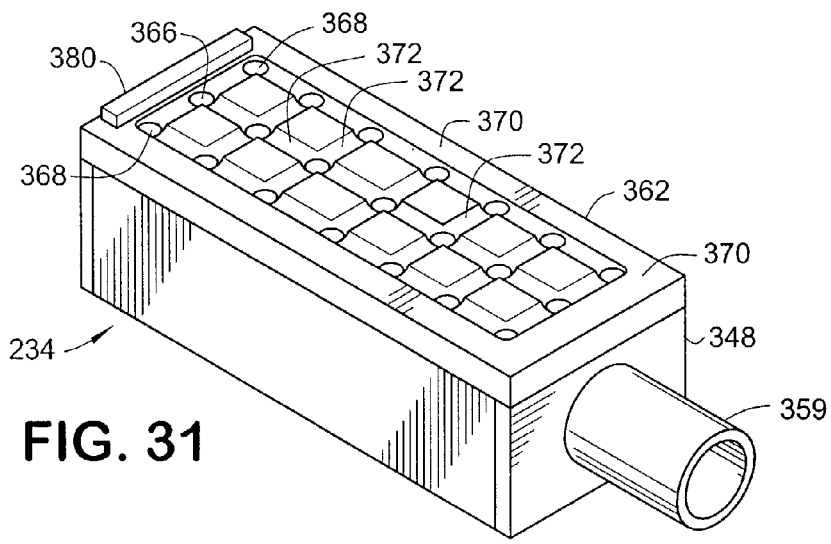
FIG. 31 is a perspective view of a vacuum-assisted chuck used to hold the natural stone cover plate while grinding.
Figure 32:
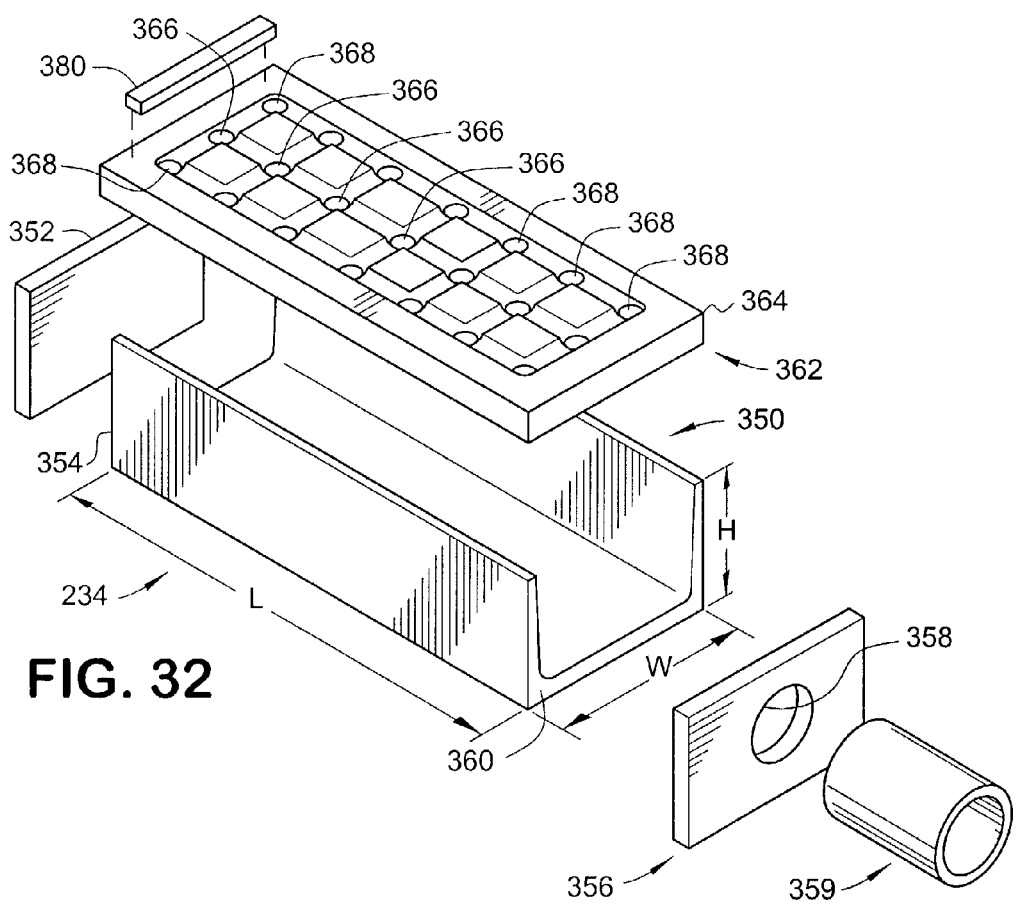
FIG. 32 is an exploded perspective view of the vacuum-assisted chuck of FIG. 31.

FIG. 31 is a perspective view of a vacuum-assisted chuck 234 used to hold the blank cover plates 230 during the grinding process. FIG. 32 is an exploded perspective view of the vacuum-assisted chuck 234 of FIG. 31.

Preferably, the vacuum-assisted chuck 234 is designed to hold four blank natural stone plates 230 at a time. Preferably, the blank natural stone plates 230 are placed onto the chuck 234 and the vacuum source (a 16 gallon wet/dry shop vacuum is preferred) is turned on wherein the blank natural stone plates 230 are tightly held on the chuck 234 and maybe reduced in thickness to the desired size. Applicant has found that four plates at a time is most efficient for the grinding process. Preferably, the vacuum-assisted chuck 234 is made of metal such that a magnetic chuck, which is preferably used on the grinding machine, will be able to magnetically hold the vacuum-assisted chuck 234 when placed on a slidable table 236 (illustrated in FIG. 19). In a preferred embodiment, the vacuum-assisted chuck 234 is made of steel. Most preferably, corrosion-resistant steel is used (such as stainless steel). Preferably, a base 348 is created using a steel U-channel 350, preferably C-5 steel U-channel having a wall thickness of about five-sixteenths of an inch, a width W of about five inches (to accommodate a plate length of about four and five-eighths inches) and a side height H of about one and three-quarters inches is used. Preferably, the C-channel is cut to a length L of about thirteen inches (to accommodate four plates wide, each respective plate having a width of about three and an eighth inches). Under appropriate circumstances, other thickness and dimensions may suffice. Preferably, a solid steel plate 352, preferably having a wall thickness of about five-sixteenths of an inch, is attached to one end 354 of the C-channel, as shown. Preferably, the solid steel plate 352 is weldably attached to end 354. Preferably, a solid steel plate 356, preferably having a wall thickness of about five-sixteenths of an inch, with a central aperture 358 is attached to the other end 360 of the C-channel, as shown. Preferably, the central aperture 358 has a diameter of about three-quarters of an inch (or sized to accommodate whatever sized pipe attachment will be used). Preferably, the steel plate 356 is weldably attached to end 360. Preferably, a three-quarters inch diameter pipe 359 is then weldably attached to the solid steel plate 356 aligned and adjacent with the central aperture 358, as shown. Under appropriate circumstances, other sizes and dimensions or attachment arrangements may suffice.

Preferably, the top 362 of the vacuum-assisted chuck 230 is made using a solid steel plate 364, preferably having a wall thickness of about five-sixteenths of an inch, which is machined in the following described manner. Preferably, one-quarter inch diameter apertures are drilled completely through the solid steel plate 364 beginning with a central group of apertures 366 placed along the central longitudinal axis of the solid steel plate 364 approximately one and one-half inches apart, as shown. Preferably, another group of one-quarter inch diameter apertures 368 is drilled on each transverse side of the central apertures 366, also about one and one-half inches apart, both from the central apertures 366 and from each respective adjacent aperture 368, as shown. The above-described arrangement embodies herein a vacuum-assisted chuck comprising at least one substantially-hollow boxlike body wherein: at least one upper surface of such chuck comprises a set of apertures structured and arranged to hold, using a vacuum created from a wet/dry shop vacuum device, at least one stony custom cover plate during a surface grinding step.

Preferably, there is a solid steel border 370 around the perimeter of the top 362 about one-quarter to one-half inch wide, as shown. Under appropriate circumstances, other dimensions or arrangements may suffice. For example, if another sized cover plate or quantity is desired, one may utilize a manufacturing method of such blank cover plates 230 wherein it may be preferable to change the above-described dimensions.

Preferably, after the apertures 366 and 368 are drilled, grooves 372 are formed adjoining all the apertures 366 and 368, as shown. Preferably, the grooves 372 are made by using a right-angle grinder with a metal-cutting blade. Under appropriate circumstances, other tools may be utilized to form the grooves 372. Preferably, the grooves 372 assist in providing a uniform suction on the blank cover plates 230. Preferably, the top 362 is then weldably attached to the base 348, as shown. The above-described arrangement embodies herein a set of grooves connecting all of such set of apertures on such at least one upper surface of such chuck.

Preferably, a one-eighth inch thick solid plastic stop 380 is adhesively placed on the top and end of the vacuum-assisted chuck 230, as shown to act as an aligning stop when placing the cover plates onto the vacuum-assisted chuck 230. Under appropriate circumstances, other arrangements may suffice. For example small welds could be used for a stop.

The vacuum-assisted chuck 230 is now ready to be connected to a vacuum source. Preferably, a typical sixteen-gallon wet/dry shop vacuum is used. Such a shop vacuum is readily available at most hardware stores. Preferably, the hose to the shop vacuum is simply attached to the pipe 359 using a clamp or even duct tape. Under appropriate circumstances, other types of vacuum may be used, however, Applicant prefers an inexpensive arrangement.

It is once again noted that the manufacturing techniques described herein may be critical because of the ease of breakage of natural stone and stony materials.

It is noted that, under appropriate circumstances, the methods and products disclosed herein may be applied to other appropriate brittle materials.

Although applicant has described applicant's preferred embodiments of this invention, it will be understood that the broadest scope of this invention includes such modifications as diverse shapes and sizes and materials. Such scope is limited only by the below claims as read in connection with the above specification.

Further, many other advantages of applicant's invention will be apparent to those skilled in the art from the above descriptions and the below claims.

What is claimed is:

1. A system for providing at least one stony custom cover plate to at least one customer for use with at least one electrical box holding at least one electrical service device for use with such cover plate, comprising, in combination:
   a) receiving a quantity of desired stony material;
   b) reducing each received item of such material so requiring down to at least one blank of a working width for easier handling;
   c) reducing the thickness of each such blank to a desired thickness for a desired such cover plate;
   d) reducing each such blank to at least one plate to provide the desired cover plate dimensions;
   e) drilling at least one hole through such thickness of such plate;
   f) machining out such at least one hole to form at least one larger aperture through such plate adapted to expose such at least one electrical service device for use; and
   g) buffing at least one plate edge.

2. The system according to claim 1 wherein such stony material consists essentially of natural stone.

3. The system according to claim 2 wherein such reducing down to blanks is accomplished using a common table saw.

4. The system according to claim 3 wherein:
   a) such desired thickness is about one-eighth inch to about three-eighths inch; and
   b) at least one jig is used to hold such plate during the machining step.

5. The system according to claim 2 wherein such desired thickness is about one-eighth inch to about three-eighths inch.

6. The system according to claim 5 wherein such desired thickness is about three-eighths inch.

7. The system according to claim 6 further comprising:
   a) reducing such thickness of such plate adjacent such aperture, to form a recess, in such manner that, if such cover plate is attached over a particular such electrical service device having a particular outer contour, an outer surface of such cover plate is substantially aligned with an outer surface of such electrical service device.

8. The system according to claim 7 wherein: such recess is formed by routing.

9. The system according to claim 7 wherein reducing the thickness of each such blank to a desired thickness for a desired such cover plate comprises, at least partially, grinding a rear unfinished surface of such plate, using a surface grinder, to achieve such desired thickness.

10. The system according to claim 9 wherein such step of surface grinding comprises use of a vacuum-assisted chuck.

11. The system according to claim 7 comprising the following ordered steps:
    a) drilling at least one pilot hole for routing;
    b) routing such at least one such recess in such rear surface;
    c) drilling, in such front surface, at least one screw-mounting hole;
    d) chamfering such at least one screw-mounting hole;
    e) routing such at least one aperture; and
    f) chamfering at least one peripheral edge of such plate.

12. A natural stone article having a shape manufactured in accordance with the process of claim 7.

13. The system according to claim 2 wherein at least one jig is used to hold the plate during at least one such machining step.

14. A stony-material article having a shape manufactured in accordance with the process of claim 1.

* * * * *